United States Patent

Sato et al.

[11] Patent Number: 5,804,945
[45] Date of Patent: Sep. 8, 1998

[54] DC POWER SUPPLY SYSTEM WITH AUTOMATIC RECHARGING FOR STORAGE BATTERY

[75] Inventors: Osamu Sato; Takahiro Akiyama, both of Yokohama; Tokunori Honma, Iwaki, all of Japan

[73] Assignee: Furukawa Denchi Kabushiki Kaisha, Kanagawa-ken, Japan

[21] Appl. No.: 967,788

[22] Filed: Nov. 10, 1997

Related U.S. Application Data

[63] Continuation of Ser. No. 743,840, Nov. 5, 1996, abandoned.

[30] Foreign Application Priority Data

Nov. 7, 1995 [JP] Japan .................................. 7-313546

[51] Int. Cl.⁶ ............................................ H02J 7/00
[52] U.S. Cl. ..................................... 320/134; 320/149
[58] Field of Search .................... 320/134, 138, 320/149

[56] References Cited

U.S. PATENT DOCUMENTS

| 4,673,826 | 6/1987 | Masson | 307/66 |
|---|---|---|---|
| 4,888,544 | 12/1989 | Terry et al. | 320/37 |
| 5,148,043 | 9/1992 | Hirata et al. | 307/66 |
| 5,198,698 | 3/1993 | Paul et al. | 307/64 |
| 5,229,707 | 7/1993 | Knepper | 320/2 |
| 5,274,320 | 12/1993 | Yamaguchi | 320/149 |
| 5,332,927 | 7/1994 | Paul et al. | 320/62 X |
| 5,583,413 | 12/1996 | Proctor et al. | 320/5 |
| 5,659,240 | 8/1997 | King | 320/134 |

FOREIGN PATENT DOCUMENTS

| 225106 A1 | 6/1987 | European Pat. Off. | H02J 7/10 |
|---|---|---|---|
| 55-131241 | 10/1980 | Japan . | |
| 61-128737 | 6/1986 | Japan . | |

*Primary Examiner*—Peter S. Wong
*Assistant Examiner*—K. Shin
*Attorney, Agent, or Firm*—Armstrong, Westerman, Hattori, McLeland & Naughton

[57] ABSTRACT

A storage battery-based DC power supply system with continuous float charging adapted to automatic continuous recharging of storage battery connected to load is disclosed. Selective recharging at the full-charge voltage and float charging voltage is performed in response to the accumulated ampere-hour value of discharge current from the storage battery, when such value reaches a predetermined threshold value set to prevent excessive recharging, which can damage storage battery.

4 Claims, 3 Drawing Sheets

DC POWER SUPPLY SYSTEM WITH AUTOMATIC RECHARGING FOR STORAGE BATTERY

This application is a continuation-in-part of application Ser. No. 08/743,840, filed Nov. 5, 1996, now abandoned.

BACKGROUND OF THE INVENTION

(1) Field of the Invention

The present invention relates to a storage battery-based DC power supply system having means for continuous automatic recharging at predetermined voltages adapted to unattended telecommunications equipment at cable landing station of submarine cable system or relay station of microwave relay system and the like. More specifically, the present invention relates to a storage battery-based DC power supply system of this type adapted to perform the so-called continuous float charging at full-charge voltage or float charging voltage, in response to built-in means for measuring the product of the magnitude of discharge current and the length of time during which flow of discharge current occured.

(2) Description of the Related Art

In a storage battery-based DC power supply system with continuous float charging, a charger having rectifier supplied with commercial power from AC mains is kept connected with both load (utilization device) and storage battery, so that it may serve as continuous float charger or trickle charger operating at comparatively low voltage level so long as DC output voltage is higher than a preset value, while it can be turned into full-charge voltage charger operating at higher voltage level when the DC output voltage is lowered beyond a prescribed lowest allowable level due to increased discharge rate or service interruption at AC mains. Once a nominal DC output voltage is sufficiently recovered as a result of recharging, the charger returns to the float charger or trickle charger mode after remaining in the full-charge voltage charger mode for a preset short period of time. The recharging at full-charge voltage is intended to shorten the time required for recovery of nominal DC output voltage. In a lead storage battery, whose nominal full-charge voltage is 2.4 V/cell, the time required for recovery of the nominal DC output voltage by recharging at 2.3 V/cell is 20 hours, while the corresponding figure for recharging at 2.4 V/cell (i.e., full-charge voltage) is 10 hours.

Since the continuous float charging is ordinarily adopted, in which storage batteries are always kept recharged by float charging or trickle charging while carrying load, main reason for lowering of DC output voltage below the lowest allowable level is the service interruption at AC mains. To compensate for discharge of storage battery power resulting from such service interruption, the recharging at full-charge voltage is usually performed immediately after the recovery of AC mains. However, excessive recharging demages storage batteries seriously.

A prior art DC power supply system disclosed in Japanese Patent Application Kokai Publication No. Sho 61-128737 entitled "Fully Continuous Float Charging DC Power Supply System" and published in Jun. 16, 1986 proposes the use of means for selectively providing for recharging a full-charge voltage (e.g., 2.4 V/cell) for ten hours, for example, and an intermediate recharge voltage (e.g., 2.2 V/cell) lower than the full-charge voltage for another ten hours, in response to the length of service interruption at AC mains, thereby to prevent the excessive recharging. However, in the proposed system, it is the length of service interruption at AC mains that controls the selection between the intermediate recharge voltage and full-charge voltage. It follows therefore that the excessive recharging can still occur if discharge current from storage battery to load remained at low level throughout the entire period of service interruption, which is longer than the prescribed value.

SUMMARY OF THE INVENTION

An object of the invention, therefore, is to overcome the above-outlined problems associated with the prior art and to provide a storage battery-based DC power supply system having means for selectively providing to storage battery the nominal full-charge voltage or float charge voltage, in response to a predetermined threshold value exceeded by the accumulated ampere-hour values calculated from the magnitude and duration of discharge current.

According to the present invention, there is provided a DC power supply system with continuous float charging, adapted to perform recharging at full-charge voltage or float charge voltage in response to a control signal, wherein said control signal is generated when a predetermined threshold value is exceeded by the accumulated value of the product of the magnitude of discharge current from storage battery and the duration of such discharge current.

In the present invention, the multiplication of the above-mentioned magnitude of the discharge current by the above-mentioned duration may be performed in digitized form, so that the accumulation of the multiplication results may also be performed in digitized form, for comparison with the predetermined threshold value defining a boundary between the full-charge voltage mode and floating charge voltage mode.

BRIEF DESCRIPTION OF THE DRAWINGS

The above and other objects, features and advantages of the present invention will be apparent from the following description of preferred embodiments of the invention taken with reference to the accompanying drawings, in which:

FIG. 3 shows another block diagram of one of the blocks shown in. FIG. 2.

PREFERRED EMBODIMENTS OF THE INVENTION

Figure 1:
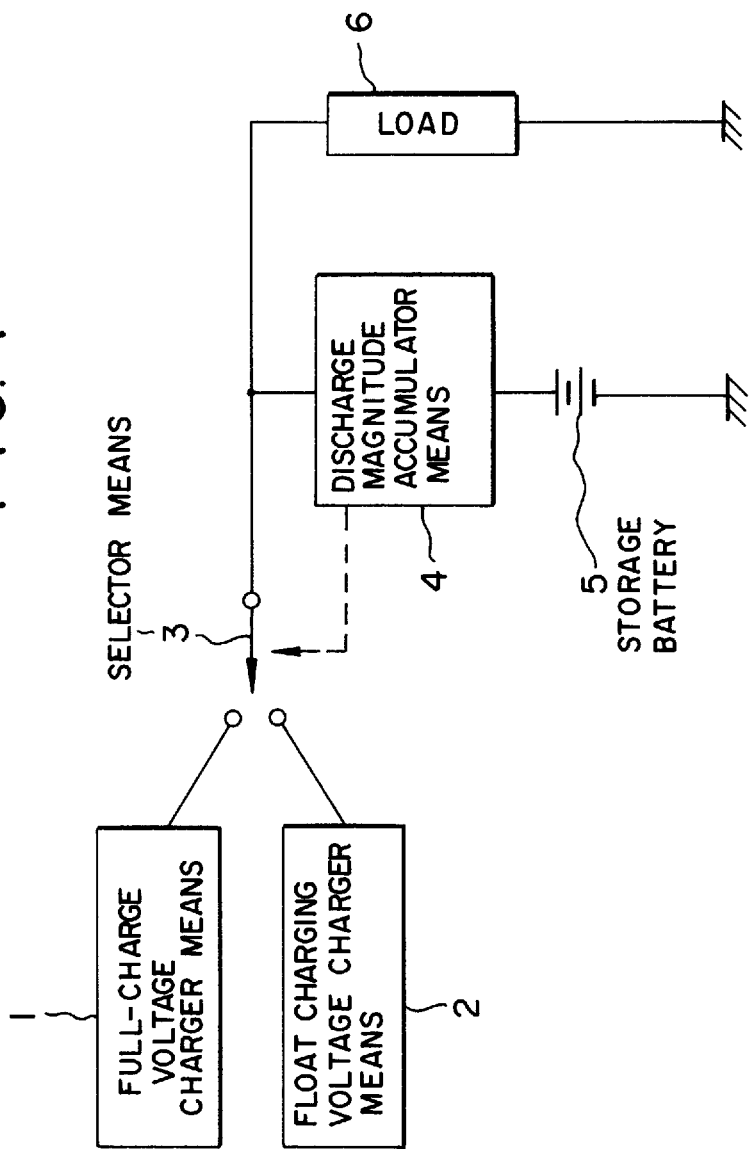
FIG. 1 shows in blocks basic structural elements of the present invention.

Referring to FIG. 1, the basic structural elements of the present invention include full-charge voltage charger means 1, float charging voltage charger means 2, selector means 3, discharge magnitude accumulator means 4, storage battery 5 and load (utilization device) 6. Charger means 1 is adapted to charge storage battery 5 at full-charge voltage up to its nominal DC output voltage. On the other hand, float charging voltage charger means 2 is adapted to perform the recharging at a recharging current rate comparable to ordinary discharge rate of the storage battery 5. Discharge magnitude accumulator means 4 is adapted to control selector means so as to select charger means 1 or 2 for the recharging of storage battery 5, in response to whether an accumulated value of the product of magnitude and duration of discharge current flowing out of storage battery 5 has exceeded a predetermined value or not.

Under ordinary state, where the float charging or trickle charging is in progress with the terminal voltage of storage battery 5 substantially equal to the nominal DC output voltage, selector means 3 is connected to float charging voltage charger means 2. The discharge current under this state is picked up by accumulator means 4, which is adapted to multiply the magnitude and duration of discharge current, to accumulate the product of such multiplication, and to compare the accumulated value with the predetermined threshold value, to provide an output to selector means 3 as the above-mentioned control signal when the threshold value is exceeded by the accumulated value. The control signal from accumulator means 4 then causes selector means 3 to be switched over to full-charge voltage charger means 1. In this way, the present invention makes it possible to perform recharging selectively at full-charge voltage or float charging voltage substantially on the basis of the amount of ampere hour of discharge current flowing out of storage battery 5, rather than the length of service interruption at AC mains, thereby to avoid excessive recharging which can damage storage battery 5.

Figure 2:
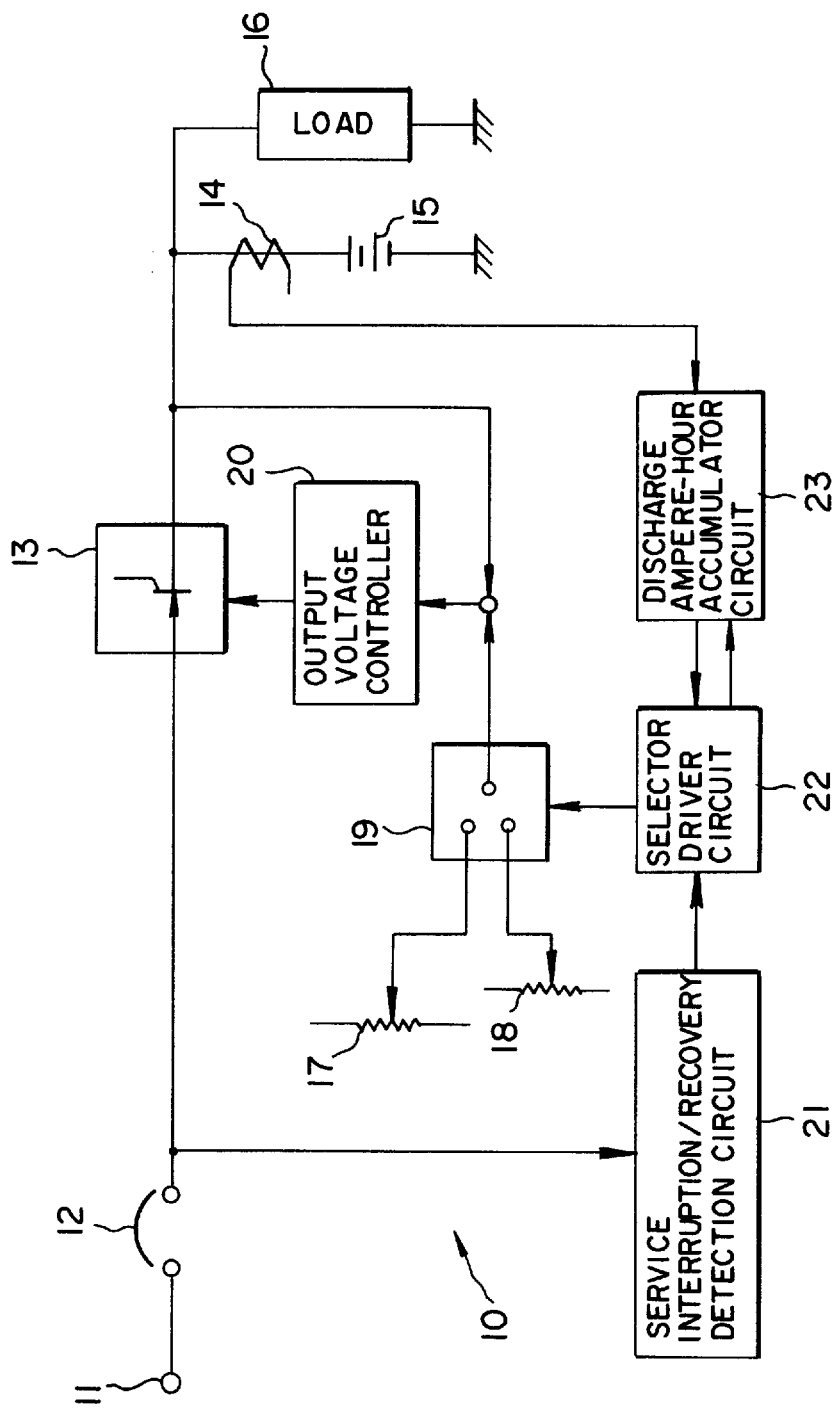
FIG. 2 show a block diagram of an embodiment of the present invention.

Referring to FIG. 2, DC power supply system 10 of the present invention is supplied with commercial power at input terminal 11 connected to AC mains. The AC power is supplied through AC power supply switch 12 to thyristor-based rectifier-smoothing circuit 13, which converts AC power into DC power to be supplied to storage battery 15 and load 16. It should be noted that storage battery 15 is connected to both load 16 and rectifier-smoothing circuit 13, so that it can be recharged by the continuous float charging while being adapted to supply DC power to load 16. Analog signal representative of the magnitude of DC current flowing into and out of storage battery 15 is picked up by current transformer 14 and supplied to discharge ampere-hour accumulator 23 to be described below in further details. Discharge ampere-hour accumulator 23 is adapted to accumulate in digital form the product of the magnitude of discharge current (flowing out of storage battery 15) and its duration, and to provide a recharge mode selection signal to selector driver circuit 22, which in turn causes selector 19 to selectively supply the output of either float charging voltage setting potentiometer 17 or full-charge voltage setting potentiometer 18 to DC output voltage controller 20. Controller 20 is adapted to control the ON state of thyristors included in rectifier-smoothing circuit 13, thereby to selectively set the output DC voltage thereof at the float charging voltage or the full-charge voltage, in response to the voltages supplied from potentiometer 17 or 18, respectively. On the other hand, service interruption/recovery detection circuit 21, connected to the output side of AC power supply switch 12, provides a signal to switch driver circuit 22 indicating the presence or absence of AC power input to rectifier-smoothing circuit 13. The full-charge voltage charger means as shown in FIG. 1 includes the float charging voltage setting potentiometer 17, the DC output voltage controller 20 and the rectifier-smoothing circuit 13 as shown in FIG. 2. The float charging voltage charger means 2 as shown in FIG. 1 includes the full-charge voltage setting potentiometer 18, the DC output voltage controller 20 and the rectifier-smoothing circuit 13 as shown in FIG. 2. The selector means 3 as shown in FIG. 1 corresponds to the selector 19 as shown in FIG. 2 and the discharge magnitude accumulator means 4 as shown in FIG. 1 includes the current transformer 14, the discharge ampere-hour accumulator circuit 23 and the selector driver circuit 22 as shown in FIG. 2.

Figure 3:
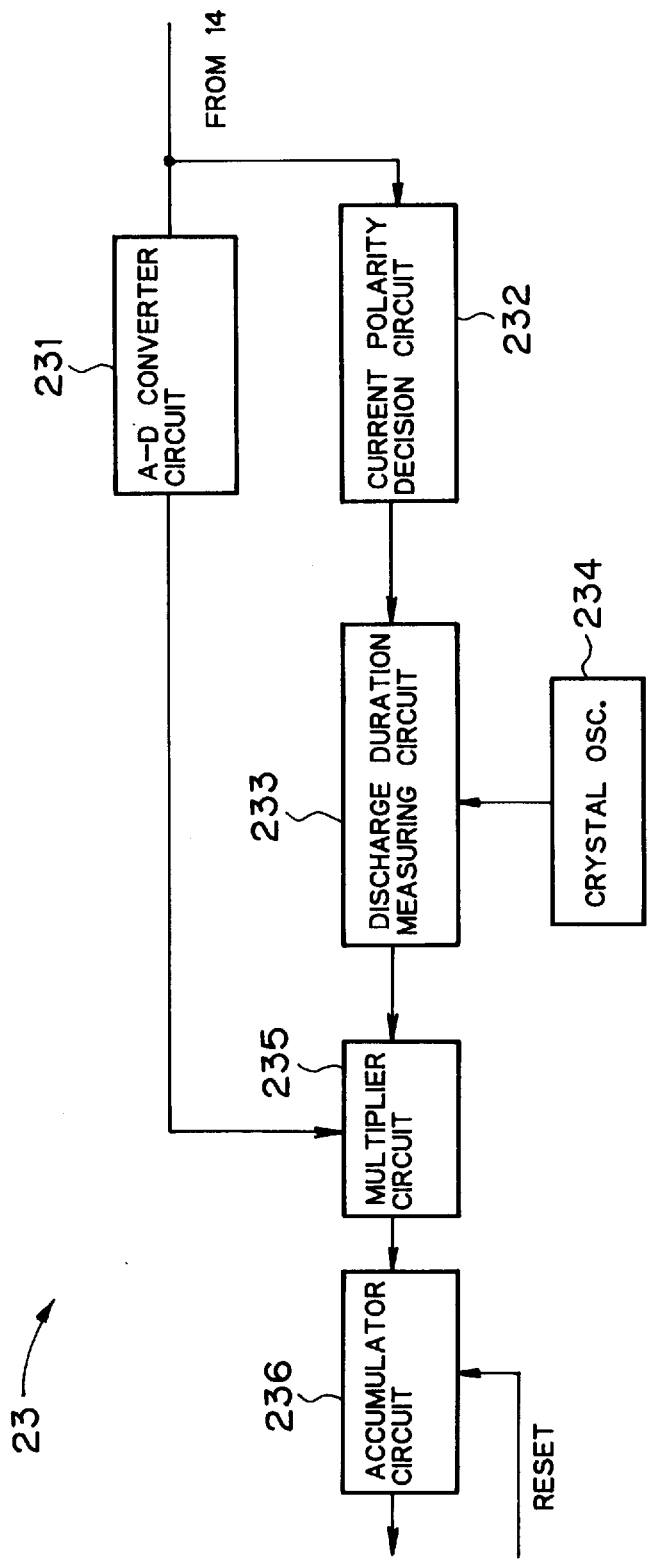

Referring to FIG. 3 showing in blocks the details of discharge ampere-hour accumulator 23, the analog voltage supplied from current transformer 14, which represents the magnitude of current flowing therethrough, is applied to both analog-to-digital (A-D) converter 231 and current polarity decision circuit 232. A-D converter 231 converts the analog input signal into digital signal, while decision circuit 232 provides output pulse whose width represents the duration in which the polarity of the input analog voltage indicates current discharge from storage battery 15. The time width of the output pulse from decision circuit 232, i.e., the duration of discharge current, is determined by discharge duration measuring circuit 233 on the basis of high frequency oscillation output supplied from crystal oscillator 234. The output of discharge duration measuring circuit 233 representative of the duration of discharge current from storage battery 15 is multiplied at multiplier 235 by the digital output from A-D converter 231 representative of the magnitude of the same discharge current. The result of multiplication is accumulated at accumulator circuit 236, which also has a predetermined threshold value stored in advance defining the recharge mode boundary. Also, accumulator circuit 236 has a comparator adapted to produce comparison output as the recharge mode selection signal when the accumulated discharge current magnitude-duration product has exceeded the threshold value.

To describe the operation of this DC power supply system with reference to FIGS. 2 and 3, at the initial stage, the ON state of AC power supply switch 12 with AC power being supplied to rectifier-smoothing circuit 13 is detected by service interruption/recovery detection circuit 21, which provides detection output to selector driver circuit 22. Selector driver circuit 22 then causes selector 19 to select float charging voltage setting potentiometer 17 in the absence of the above-mentioned recharge mode selection signal from accumulator circuit 236, thereby to set the output voltage of rectifying-smoothing circuit 13 at the float charging voltage. Float charging at the float charging voltage is continued until storage battery 15 is charged up to the nominal DC output voltage. During this charging period, the charging current flowing into storage battery 15 is detected by current transformer 14. However, current polarity decision circuit 232 does not produce output in response to the output from transformer 14 because its polarity is opposite to discharge current. When the DC nominal output voltage of the storage battery 15 is reached as a result of the float charging voltage charging, AC power supply switch 12 is turned OFF in response to output from battery terminal voltage detection means (not shown). The turning OFF of switch 12 causes service interruption/recovery detection circuit 21 to provide control signal to selector driver circuit 22. Under this state, DC power is supplied only from storage battery 15 in the form of discharge current, which is detected by current transformer 14 and whose ampere-hour value is calculated by A-D converter 231, current polarity decision circuit 232, discharge duration measuring circuit 233 and multiplier circuit 235 and then accumulated at accumulator circuit 236. When an accumulated value of the discharge magnitude duration product indicated by accumulator circuit has exceeded the predetermined threshold value, the recharge mode selection signal is outputted from accumulator circuit 236 to switch driver circuit 22. Meanwhile, the AC power supply switch 12 is turned ON in response to output from battery terminal voltage detection means, and the turning ON of switch 12 causes services interruption/recovery detection circuit 21 to provide control signal to selector driver circuit 22, which in turn provides the recharge mode selection signal to selector 19 and causes selector 19 to be switched to full-charging voltage setting potentiometer 18, and the output thereof is supplied to output voltage controller 20, and thereby output voltage of rectifier-smoothing circuit 13 is increased to full-charge voltage and the storage battery is recharged at full-charge voltage. AC power supply switch 12 is turned OFF in response to output from battery terminal voltage detection means, and turning OFF of switch 12 causes service interruption/recovery detection circuit 21 to provide control signal to selector driver circuit 22, which in turn provides reset signal to accumulator 238, and also provides the driving signal to selector 19, so that selector 19 is switched to float charging voltage setting potentiometer 17. Thereafter, the resultant full-charged battery is discharged for use, and the AC power supply switch 12 is turned ON again in response to output from the battery terminal voltage detection means, so that the storage battery is recharged at the default float-charge voltage.

In the above embodiment, the threshold value preset at accumulator circuit 236 may be 300 ampere-hours, for example, with respect to a stored battery of nominal capacity of 80 ampere-hours. The above ampere-hour value minimizes the quantity of gas emitted by the start of the recharging at full-charge voltage.

Since the restart of recharging and selection of recharging mode according to this invention are made only after the accumented ampere hour value of discharge current has exceeded the predetermined threshold value, the risk of excessive recharging is effectively eliminated.

In the above embodiment, storage battery 15, current transformer 14 and discharge ampere-hour accumulator circuit 23 may be in the form of a detachable set, so that more than one such set may be used by turns in connection with rectifier-smoothing circuit 13 and other structural elements. The one to one correspondence between storage battery 15 and accumulator circuit 23 may be secured also by installing a memory device within itself adapted to store storage battery-identifying numbers and accumulated ampere-hour values corresponding thereto. Such alternative approach can be easily adopted by providing a simple data input/display device at operator console of equipment embodying the present invention.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A DC power supply system for automatically and continuously supplying DC power to an utilization device, said system comprising:

a full-charge voltage charger means;

a float charging voltage charger means;

a selector means for switching over selectively to at least one of said full-charge voltage charger means and said float charging voltage charger means;

a storage battery connected to said selector means; and a discharge magnitude accumulator means interposed in a junction between said storage battery and the utilization device, so that recharging at least one of a float charging voltage by said charge voltage charger means and a full-charge voltage by said full-charge voltage charger means is selectively performed based on an amount of ampere hour of discharge current flowing out of said storage battery.

2. A DC power supply system according to claim 1, wherein said selector means selects said float charging voltage charger means until an accumulated value of a product of a magnitude and a duration of the discharge current flowing out of said storage battery reaches a predetermined threshold value and when the accumulated value exceeds the predetermined threshold value, said selector means is caused to switch to said full-charge voltage charger means by said discharge magnitude accumulator means.

3. A DC power supply system according to claim 2 further comprising:

an AC power supply switch connected to a rectifier-smoothing circuit and a service interruption/recovery detection circuit;

a discharge ampere-hour accumulator circuit supplied with an analog signal representative of a magnitude of discharge current flowing out of said storage battery picked up by a current transformer; and a selector driver circuit connected to said discharge ampere-hour accumulator circuit and said service interruption/recovery detection circuit, wherein, when the accumulated value exceeds the predetermined threshold value, said selector driver circuit provides a recharge mode selection signal to said selector driver circuit provides a recharge mode selection signal to said selector means which is connected to a float charging voltage setting potentiometer, and causes said selector means to be switched to a full-charge voltage setting potentiometer.

4. A DC power supply system according to claim 3, wherein a discharge ampere-hour accumulator comprises A-D converter circuit, current polarity decision circuit, discharge duration measuring circuit, multiplier circuit and accumulator circuit.

* * * * *

UNITED STATES PATENT AND TRADEMARK OFFICE
CERTIFICATE OF CORRECTION

PATENT NO.: 5,804,945
DATED : September 8, 1998
INVENTOR(S): Sato et al.

It is certified that errors appear in the above-identified patent and that said Letters Patent is hereby corrected as shown below:

In the drawings:

In Fig. 2 of the drawings, the switch was omitted inside reference number 19. The correction is shown on the attached copy of Fig. 2

Signed and Sealed this

Fourth Day of May, 1999

Q. TODD DICKINSON

*Attest:*

*Attesting Officer*    Acting Commissioner of Patents and Trademarks